United States Patent
Hahn et al.

(10) Patent No.: US 7,883,052 B2
(45) Date of Patent: Feb. 8, 2011

(54) AIRCRAFT WING FOR OVER-THE-WING MOUNTING OF ENGINE NACELLE

(75) Inventors: Andrew S. Hahn, Yorktown, VA (US);
David J. Kinney, Manteca, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 652 days.

(21) Appl. No.: 11/954,452

(22) Filed: Dec. 12, 2007

(65) Prior Publication Data

US 2009/0127405 A1 May 21, 2009

Related U.S. Application Data

(60) Provisional application No. 60/870,634, filed on Dec. 19, 2006.

(51) Int. Cl.
*B64C 39/00* (2006.01)
*B64D 27/00* (2006.01)

(52) U.S. Cl. ............... 244/45 R; 244/55; 244/12.5
(58) Field of Classification Search .......... 244/12.1, 244/13, 4 R, 23 R, 34 R, 35 R, 45 R, 55, 244/12.5, 23 D, 36, 46; D12/341
See application file for complete search history.

(56) References Cited

U.S. PATENT DOCUMENTS

| | | | |
|---|---|---|---|
| D140,302 S * | 2/1945 | Heinemann | D12/341 |
| D232,927 S * | 9/1974 | Blattner | D12/337 |
| 4,036,452 A | 7/1977 | Schairer | |
| D256,906 S * | 9/1980 | Conroy | D12/341 |
| 4,398,683 A * | 8/1983 | Schmetzer | 244/12.5 |
| 4,447,028 A * | 5/1984 | Wang | 244/212 |
| 4,449,680 A | 5/1984 | Gratzer et al. | |
| 4,449,681 A | 5/1984 | Gratzer et al. | |
| 4,482,108 A * | 11/1984 | Sutton | 244/12.4 |
| 5,135,185 A | 8/1992 | Adamson et al. | |
| 6,102,328 A | 8/2000 | Kumata et al. | |
| 6,308,913 B1 | 10/2001 | Fujino et al. | |

OTHER PUBLICATIONS

D.J.Kinney et al. in "Comparison of Low and High Nacelle Subsonic Transport Configurations," American Institute of Aeronautics and Astronautics, AIAA 1997-2318, (1997) pp. 806-819.

* cited by examiner

*Primary Examiner*—Joshua J Michener
(74) *Attorney, Agent, or Firm*—Andrea Z. Warmbier; Robin W. Edwards

(57) ABSTRACT

An aircraft wing has an inboard section and an outboard section. The inboard section is attached (i) on one side thereof to the aircraft's fuselage, and (ii) on an opposing side thereof to an inboard side of a turbofan engine nacelle in an over-the-wing mounting position. The outboard section's leading edge has a sweep of at least 20 degrees. The inboard section's leading edge has a sweep between –15 and +15 degrees, and extends from the fuselage to an attachment position on the nacelle that is forward of an index position defined as an imaginary intersection between the sweep of the outboard section's leading edge and the inboard side of the nacelle. In an alternate embodiment, the turbofan engine nacelle is replaced with an open rotor engine nacelle.

24 Claims, 8 Drawing Sheets

AIRCRAFT WING FOR OVER-THE-WING MOUNTING OF ENGINE NACELLE

Pursuant to 35 U.S.C. §119, the benefit of priority from provisional application 60/870,634, with a filing date of Dec. 19, 2006, is claimed for this non-provisional application.

ORIGIN OF THE INVENTION

This invention was made by employees of the United States Government and may be manufactured and used by or for the Government of the United States of America for governmental purposes without the payment of any royalties thereon or therefore.

BACKGROUND OF THE INVENTION

1. Field of the Invention

This invention relates to wing configurations for aircraft. More specifically, the invention is an aircraft wing that supports an over-the-wing mounting of an engine nacelle.

2. Description of the Related Art

In aircraft design, engine nacelle geometry and placement has a significant impact on an aircraft's aerodynamics, structural requirements, engine performance, noise levels, maintenance, crash worthiness, passenger comfort, and cost. Balancing all of these criteria/requirements, aircraft designers have traditionally relied on the mounting of engine nacelles either on pylons attached to the underside of an aircraft's wings or attached to the aft portion of the aircraft's fuselage. Another engine nacelle placement option that has been considered is over-the-wing placement. However, the large upper surface pressure disturbances caused by such placement have not made this placement option popular. Thus, it is generally accepted in the art that an efficient-design, under-the-wing pyloni-mounted engine nacelle provides the best mounting option for most current engine designs. However, aircraft engine design is moving towards the development of high-bypass ratio turbofans.

Briefly, a high-bypass ratio provides increased efficiency at decreased noise levels, thereby making it desirable to develop and integrate these types of engines into aircraft design. However, high-bypass ratio turbofan engines tend to have relatively large fan diameters. This fact raises new engine nacelle placement issues for aircraft designers trying to use traditional under-the-wing engine placement. These new issues include reduced ground clearance to the bottom of the engine under normal and collapsed nose gear situations, increased foreign object damage susceptibility, increased drag from ever shorter pylons, and greater weight from longer landing gear. Accordingly, aircraft designers have started to explore over-the-wing engine nacelle placement for turbofan engines. For example, FIGS. 1A and 1B illustrate a top and side view, respectively, of an over-the-wing engine nacelle design proposed by D. J. Kinney et al. in "Comparison of Low and High Nacelle Subsonic Transport Configurations," American Institute of Aeronautics and Astronautics, AIAA-1997-2318, 1997, pp. 806-819. In this design, the aircraft's wing 10 has an unswept inboard section 10A attached to the inboard side of an engine nacelle 20 and has a swept outboard section 10B attached to the outboard side of engine nacelle 20. The leading edge 12 of inboard section 10A is aligned with the point (indicated by reference numeral 22) on the inboard side of engine nacelle that intersects with the sweep line 14A defined by the leading edge 14 of outboard section 10B. The problems with this design are that (i) the shock wave is not confined to the forward part of the airfoil which increases compressibility drag, (ii) there is lift loss due to reduced wing area which raises stall speed and lowers cruise buffet Mach number, (iii) wing bending stress is higher due to a reduction in thickness at the fuselage which increases weight, and (iv) torsional stiffness is reduced due to the reduced airfoil cross section area at the fuselage which lowers flutter speed.

SUMMARY OF THE INVENTION

Accordingly, it is an object of the present invention to provide a wing design that supports an over-the-wing engine nacelle mounting.

Another object of the present invention is to provide an aerodynamically efficient wing design that supports an over-the-wing mounting of a turbofan engine nacelle.

Another object of the present invention is to provide an aerodynamically efficient wing design that supports an over-the-wing mounting of an open rotor engine nacelle.

Other objects and advantages of the present invention will become more obvious hereinafter in the specification and drawings.

In accordance with the present invention, an aircraft wing has an inboard section and an outboard section. The inboard section is attached (i) on one side thereof to the aircraft's fuselage, and (ii) on an opposing side thereof to an inboard side of a turbofan engine nacelle in an over-the-wing mounting position. The outboard section is attached on one side thereof to an outboard side of the nacelle. The outboard section's leading edge has a sweep of at least 20 degrees. The inboard section's leading edge has a sweep between −15 and +15 degrees. Further, the inboard section's leading edge extends from the fuselage to an attachment position on the nacelle that is forward of an index position on the inboard side of the nacelle. The index position is defined as an imaginary intersection between the sweep of the outboard section's leading edge and the inboard side of the nacelle. In an alternate embodiment, the turbofan engine nacelle is replaced with an open rotor engine nacelle.

DETAILED DESCRIPTION OF THE INVENTION

Figure 2:
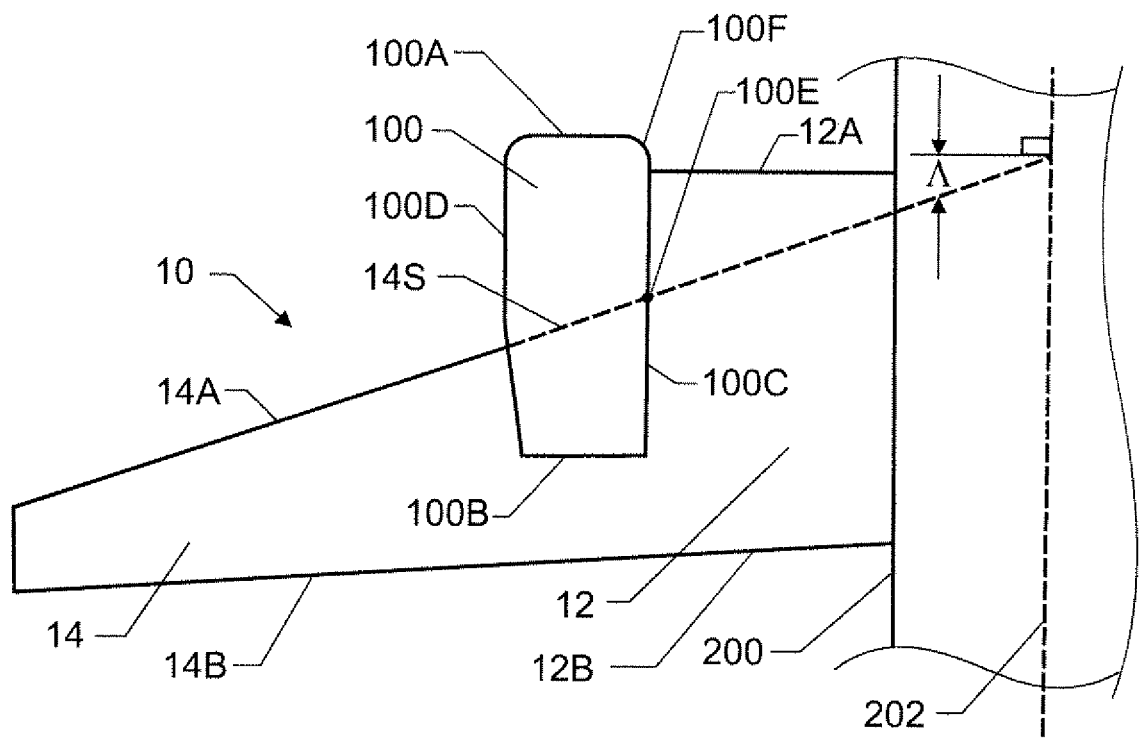
FIG. 2 is a top schematic view of a wing that supports an over-the-wing mounting of a turbofan engine nacelle in accordance with an embodiment of the present invention.
Figure 3:
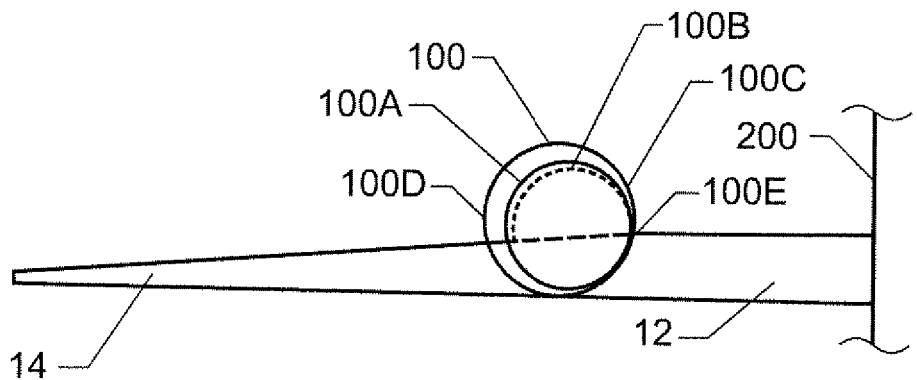
FIG. 3 is a front schematic view of the wing and turbofan engine nacelle.

Referring now to the drawings, in which like reference numbers represent corresponding parts throughout, and more particularly to FIG. 2, a top view is shown of a wing 10 in accordance with an embodiment of the present invention. Wing 10 supports an over-the-wing mounting of a turbofan engine nacelle 100 in a "slipper" (no pylon) fashion. For example, as illustrated in the front view of wing 10 in FIG. 3, engine nacelle 100 is attached/integrated into wing 10 with its intake or highlight 100A being represented by the solid-line circle and its D-shaped exhaust opening (formed above wing 10) represented by dashed lines 100B. Engine nacelle 100 is located on the forward portion of wing 10, with the exhaust exit 100B generally located at approximately mid-chord to maximize the noise shielding effect. However, it is to be understood that engine nacelle 100 could assume other vertical positions relative to wing 10 that still qualify as an over-the-wing mounting without departing from the scope of the present invention. The particular methods of attaching and/or integrating engine nacelle 100 with wing 10 via a "slipper" attachment would be understood in the art and are not limitations of the present invention.

In terms of the present invention, wing 10 has an inboard section 12 and an outboard section 14. Inboard section 12 is attached to and extends from a plane's fuselage 200 where such attachment is well understood in the art. Inboard section 12 extends from fuselage 200 to an inboard side 100C of engine nacelle 100 that faces fuselage 200. Outboard section 14 extends outward from an outboard side 100D of engine nacelle 100. More specifically, outboard section 14 defines a conventional transonic wing shape that has a substantially trapezoidal planform and that has a leading edge 14A with a leading edge sweep of 20 degrees or more. The sweep angle A is measured relative to a line perpendicular to the longitudinal axis 202 of fuselage 200 as is known in the art.

In the illustrated embodiment, inboard section 12 has a leading edge 12A with a leading edge sweep of approximately 0 degrees. Further, leading edge 12A mates with the inboard side 100C of engine nacelle 100 at a position on nacelle 100 that is forward of a point 100E on inboard side 100C of engine nacelle 100. Point 100E is defined as the location on inboard side 100C where the leading edge sweep (represented by dashed lines 14S) of leading edge 14 intersects inboard side 100C. In the illustrated embodiment, leading edge 12A mates with inboard side 100C at a position that is approximately located at the nacelle's lip region 100F.

The sweep of trailing edges 12B and 14B of inboard section 12 and outboard section 14, respectively, can be designed on a case-by-case basis and are not part of the present invention. For example, the sweeps of trailing edges 12B and 14B can be the same or different without departing from the scope of the present invention. Further, the sweep of trailing edge 12B could be approximately 0 degrees just like leading edge 12A.

Figure 4:
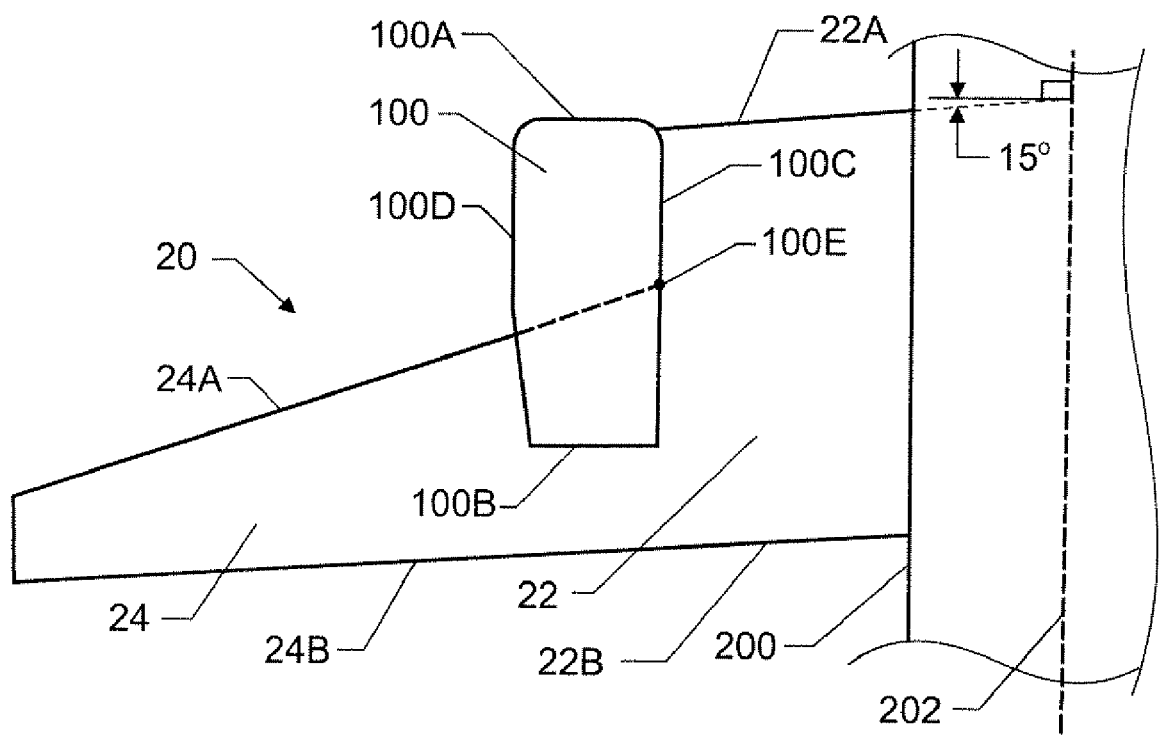
FIG. 4 is a top schematic view of a wing that supports an over-the-wing mounting of a turbofan engine nacelle in accordance with another embodiment of the present invention.

The present invention is not limited to inboard section wing sweeps of approximately 0 degrees. For example, as illustrated in FIG. 4, a wing 20 has an inboard section 22 with a leading edge 22A that has a sweep of approximately 15 degrees while leading edge 24A of outboard section 24 has a sweep of at least 20 degrees. Further, leading edge 22A attaches to inboard side 100C at a position on engine nacelle 100 that is just aft of the highlight 100A of engine nacelle 100. Once again, the configuration of trailing edges 22B and 24B is not a limitation of the present invention.

Figure 1A:
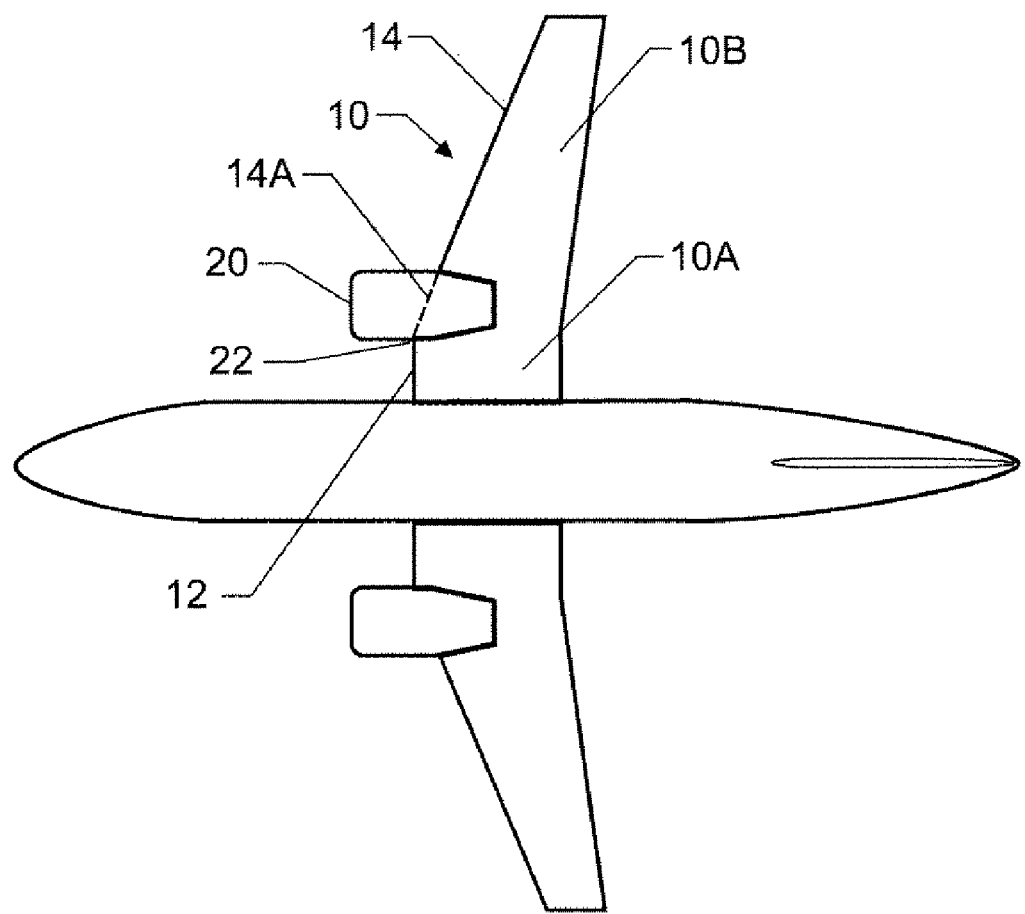
FIG. 1A is a top view of an aircraft illustrating a prior art wing design for over-the-wing engine nacelle placement.
Figure 1B:
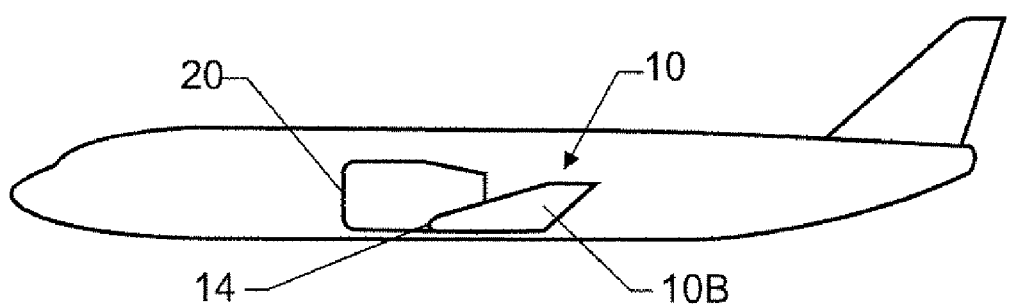
FIG. 1B is a side view of the aircraft in FIG. 1A.
Figure 5:
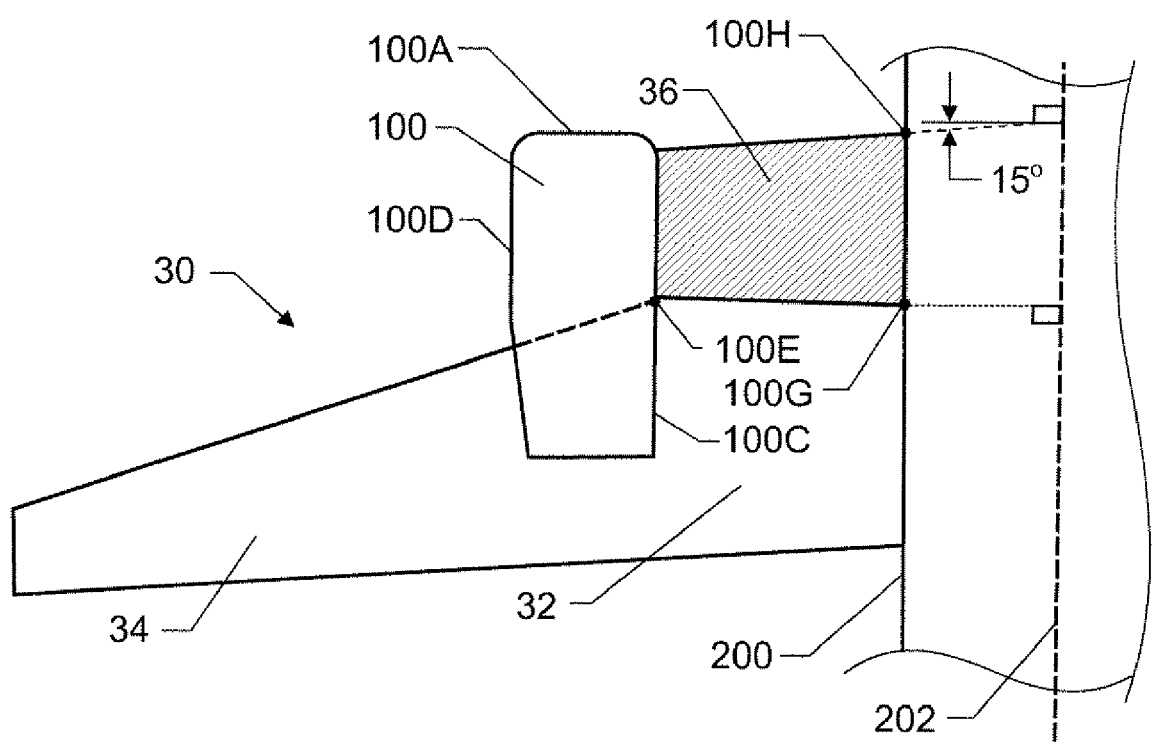
FIG. 5 is a top schematic view of a wing illustrating the range of positions for the leading edge of the wing's inboard section for a turbofan engine nacelle in accordance with the present invention.

The requirements of the present invention can be generalized and will be described with the aid of FIG. 5 where a wing 30 has an inboard section 32 and an outboard section 34. Outboard section 34 is a conventional transonic design that is analogous to outboard section 14 (FIG. 1). A leading edge of inboard section 32 must have a sweep of −15 to +15 degrees and lie anywhere in a hatched region 36 of inboard section 32. Note that hatched region 36 is forward of (previously defined) point 100E on inboard side 100C of engine nacelle 100 and ends on engine nacelle 100 just aft of its highlight 10A. Additionally, the hatched region extends from point 100G to point 100H on the fuselage 200.

The advantages of the present invention are numerous. The sweep angle and location of the wing's inboard section relative to an over-the-wing mounted engine nacelle locates and confines a shock over the leading edge of the wing. This enhances the leading edge suction of the affected wing area while reducing the severity of the shock located near the trailing edge of the wing. The net effect is to reduce overall compressibility-based interference drag. Wetted area reduction results in a lower friction drag.

Placing the engine exhaust nozzle above the wing shields the lower hemisphere from that noise source, thereby reducing the noise experienced by communities on the ground. That is, engine nozzle exit is tangential to the wing's upper surface and is generally near the middle of the wing local chord to put the exhaust noise source in the best position for the wing shielding effect. Further, by integrating the engine nacelle into the wing thereby reducing nacelle wetted area and eliminating the engine mounting pylon altogether, wetted area is used more efficiently to reduce drag. This allows a nozzle location above the wing that is at least as mission capable and cost effective as the conventional installation, which then enables a community noise reduction through the above-described shielding effect.

Elimination of the historically unacceptable interference drag of over-the-wing nacelle installation enables many benefits to be realized (e.g., flexible installation of high-bypass engines, excellent engine clearance under emergency situations such as collapsed landing gear or water ditching, reduced "foreign object damage" susceptibility, reduced ground damage from servicing accidents, increased torsional stiffness thereby increasing flutter margin, reduced community noise through wing shielding, possible gapless flaps to lower airframe noise and increase lift, flexible landing gear design and placement to save weight and reduce airframe noise).

Figure 6:
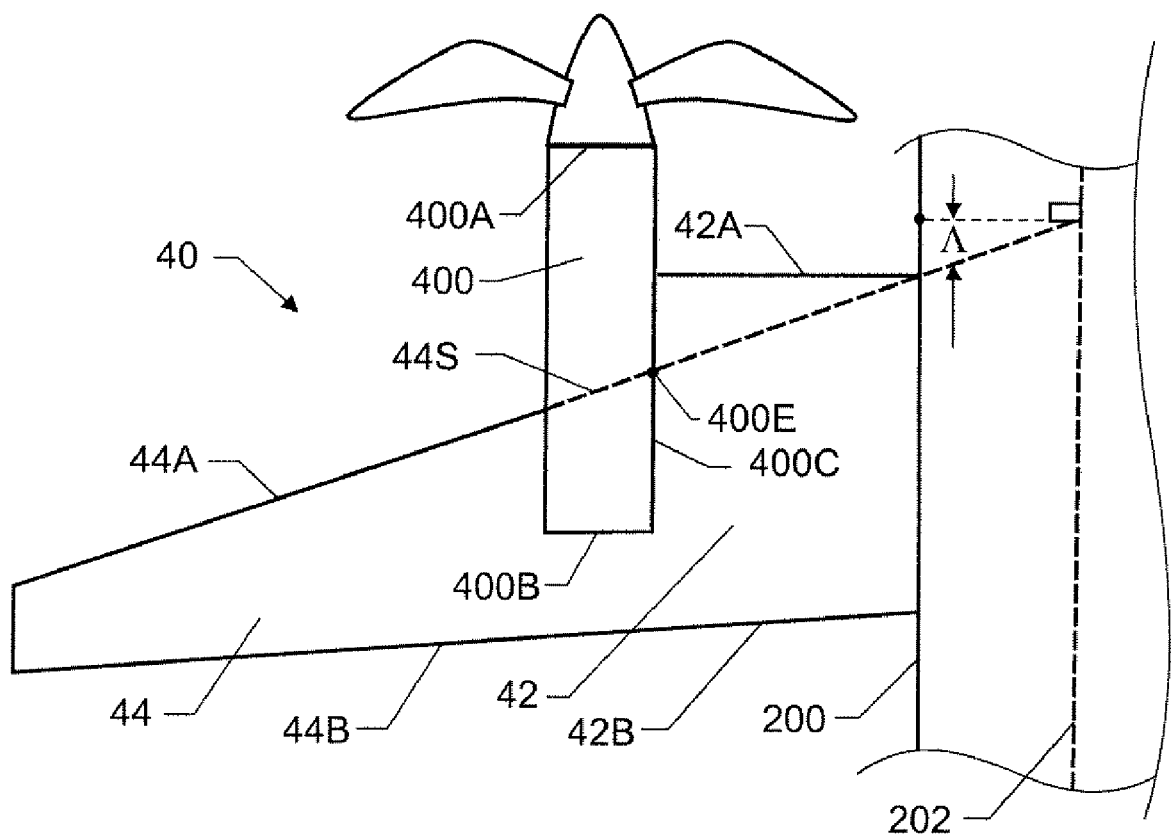
FIG. 6 is a top schematic view of a wing that supports an over-the-wing mounting of an open rotor engine nacelle in accordance with an embodiment of the present invention.
Figure 7:
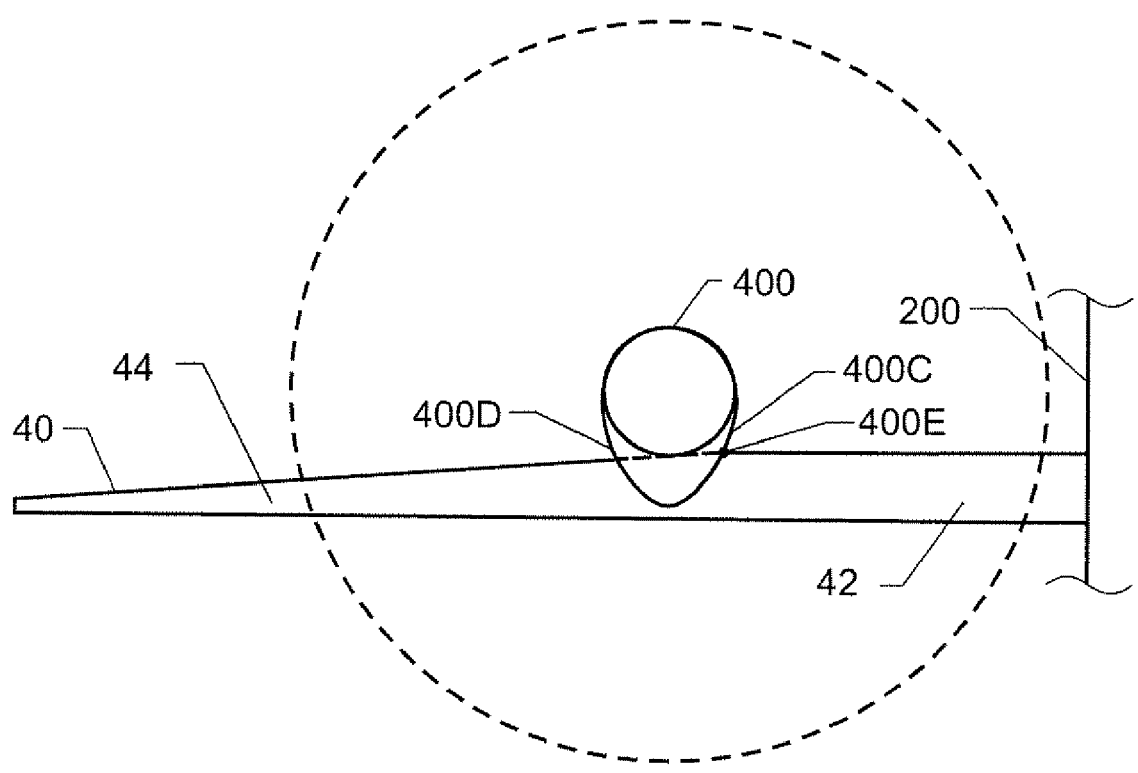
FIG. 7 is a front schematic view of the wing and open rotor engine nacelle.

In an alternate embodiment of the present invention, an open rotor (also commonly referred to in the past as unducted fan (UDF) or prop fan) is mounted in the over-the-wing configuration in a "slipper" (no pylon) fashion. Referring now to FIG. 6, wing 40 supports an over-the-wing mounting of an open rotor engine nacelle 400 having a spinner base 400A. As illustrated in the front view of wing 40 in FIG. 7, engine nacelle 400 is attached/integrated onto wing 40. Engine nacelle 400 is located on the forward portion of wing 40, with the exhaust exit 400B generally located at approximately mid-chord to maximize the noise shielding effect. It is to be understood that engine nacelle 400 could assume other vertical positions relative to wing 40 that still qualify as an over-the-wing mounting without departing from the scope of the present invention. The particular methods of attaching and/or integrating engine nacelle 400 with wing 40 via a "slipper" attachment would be understood in the art and are not limitations of the present invention.

Inboard section 42 of wing 40 is attached to and extends from a plane's fuselage 200 where such attachment is well understood in the art. Inboard section 42 extends from fuselage 200 to an inboard side 400C of engine nacelle 400 that faces fuselage 200. Outboard section 44 extends outward from an outboard side 400D of engine nacelle 400. More specifically, outboard section 44 defines a conventional transonic wing shape that has a substantially trapezoidal planform and that has a leading edge 44A with a leading edge sweep of 20 degrees or more. The sweep angle A is measured relative to a line perpendicular to the longitudinal axis 202 of fuselage 200 as is known in the art.

Inboard section 42 has a leading edge 42A with a leading edge sweep of approximately 0 degrees. Further, leading edge 42A mates with the inboard side 400C of engine nacelle 400 at a position on nacelle 400 that is forward of a point 400E on inboard side 400C of engine nacelle 400. Point 400E is defined as the location on inboard side 400C where the leading edge sweep (represented by dashed lines 44S) of leading edge 44 intersects inboard side 400C. In the illustrated embodiment, leading edge 42A mates with inboard side 400C at a position that is located approximately midway between the spinner base 400A and point 400E.

The sweep of trailing edges 42B and 44B of inboard section 42 and outboard section 44, respectively, can be designed on a case-by-case basis and are not part of the present invention. For example, the sweeps of trailing edges 42B and 44B can be the same or different without departing from the scope of the present invention. Further, the sweep of trailing edge 42B could be approximately 0 degrees just like leading edge 42A.

Figure 8:
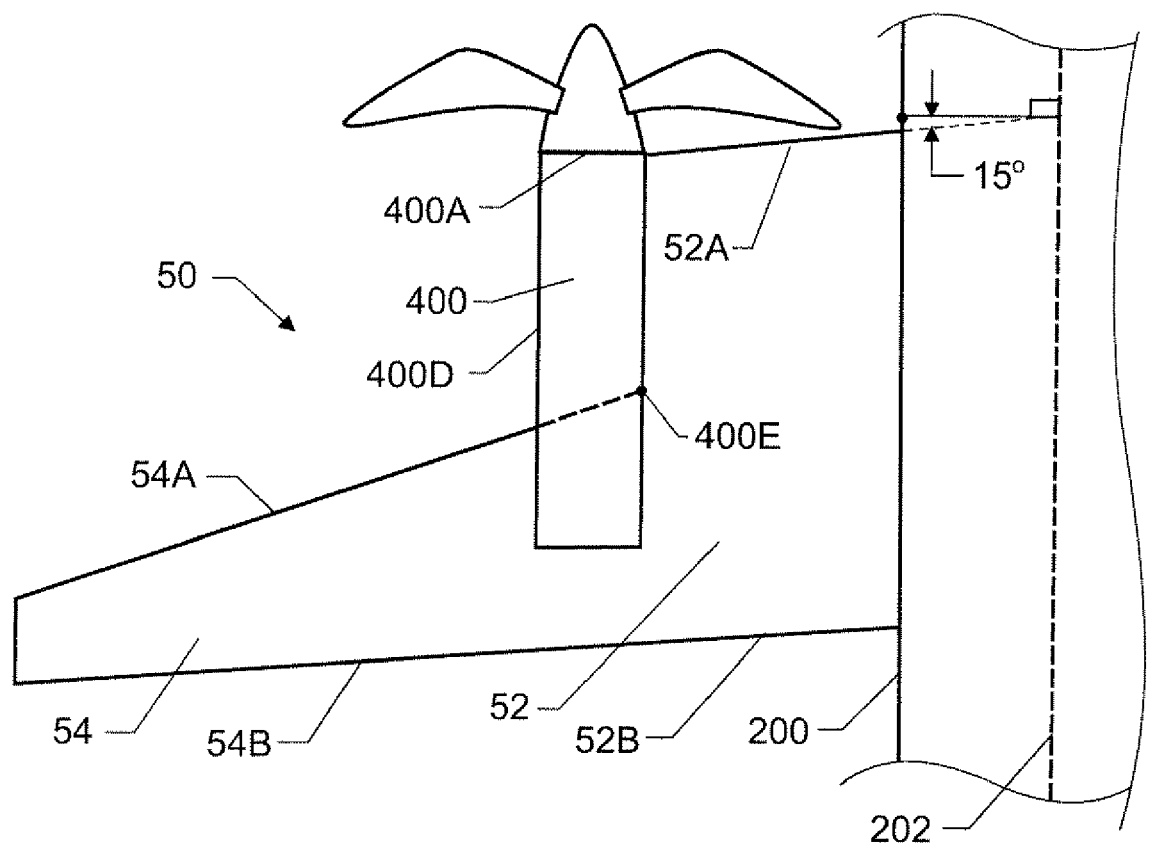
FIG. 8 is a top schematic view of a wing that supports an over-the-wing mounting of an open rotor engine nacelle in accordance with another embodiment of the present invention.

This embodiment is not limited to inboard section wing sweeps of approximately 0 degrees. For example, as illustrated in FIG. 8, a wing 50 has an inboard section 52 with a leading edge 52A that has a sweep of 15 degrees while leading edge 54A of outboard section 24 has a sweep of at least 20 degrees. Further, leading edge 52A attaches to inboard side 400C at a position on engine nacelle 400 that is approximately at the spinner base 400A of engine nacelle 400. Once again, the configuration of trailing edges 52B and 54B is not a limitation of the present invention.

Figure 9:
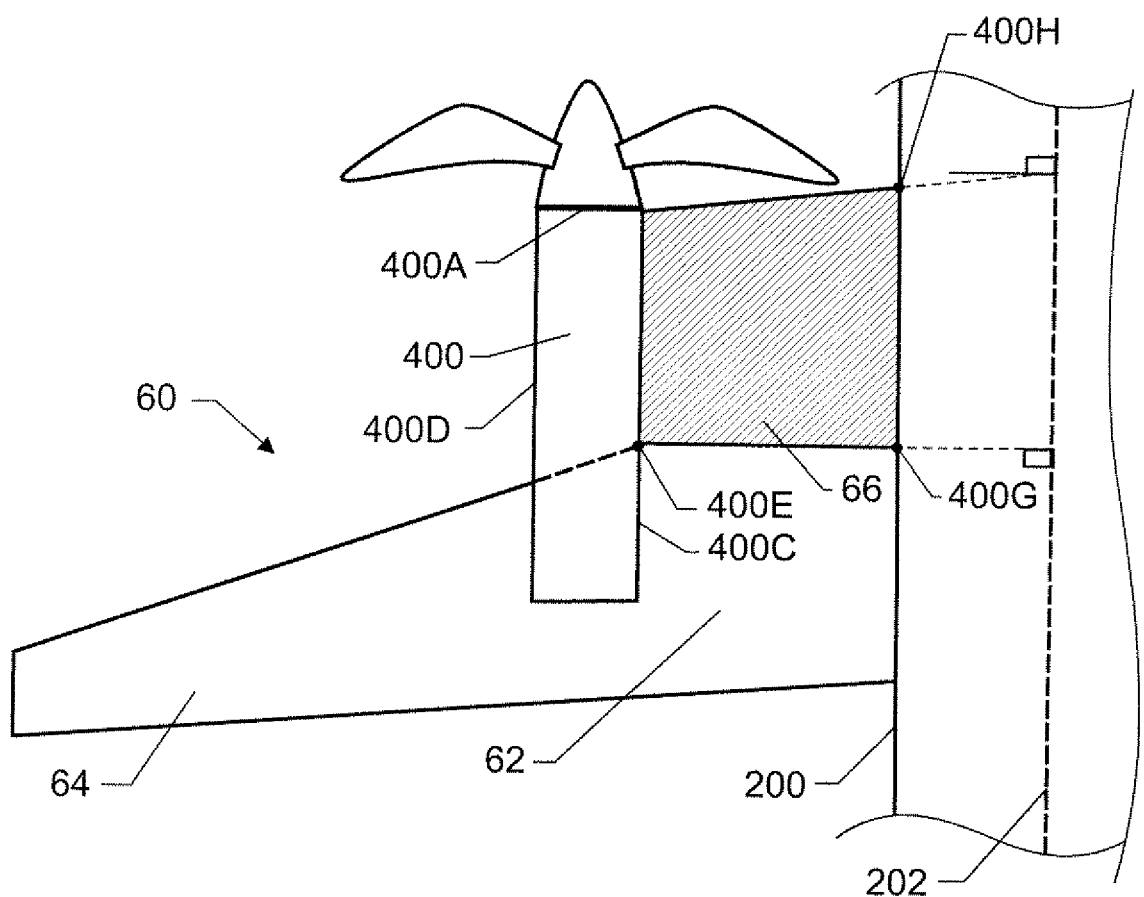
FIG. 9 is a top schematic view of a wing illustrating the range of positions for the leading edge of the wing's inboard section for an open rotor engine nacelle in accordance with the present invention.

The requirements of this embodiment can be generalized and will be described with the aid of FIG. 9 where a wing 60 has an inboard section 62 and an outboard section 64. Outboard section 64 is a conventional transonic design that is analogous to outboard section 14 (FIG. 1). A leading edge of inboard section 62 must have a sweep of −15 to +15 degrees and lie anywhere in a hatched region 66 of inboard section 62. Note that hatched region 66 is forward of (previously defined) point 400E on inboard side 400C of engine nacelle 400 and ends on engine nacelle 400 at approximately the spinner base 400A. Additionally, the hatched region extends from point 400G to point 400H on the fuselage 200.

Although the invention has been described relative to specific embodiments thereof, there are numerous variations and modifications that will be readily apparent to those skilled in the art in light of the above teachings. For example, while the present invention is particularly applicable to wings mounted low on the fuselage, it would also be applicable to wings mounted mid or high on the fuselage. It is therefore to be understood that, within the scope of the appended claims, the invention may be practiced other than as specifically described.

What is claimed as new and desired to be secured by Letters Patent of the United States is:

1. A wing, comprising:
    an inboard section adapted to be attached on one side thereof to a fuselage and adapted to be attached on an opposing side thereof to an inboard side of an engine nacelle in an over-the-wing mounting position, said inboard section having a leading edge and a trailing edge;
    an outboard section adapted to be attached on one side thereof to an outboard side of said nacelle, said outboard section having a leading edge and a trailing edge;
    said outboard section leading edge having a sweep of at least 20 degrees;
    said inboard section leading edge having a sweep between −15 and +15 degrees; and
    said inboard section leading edge extending from said fuselage to an attachment position on said nacelle, wherein the attachment position on said fuselage and said attachment position on said nacelle are forward of an index position on the inboard side of said nacelle, said index position defined as an imaginary intersection between said sweep of said outboard section and said inboard side of said nacelle.

2. A wing as in claim 1 wherein said sweep of said inboard section leading edge is 0 degrees.

3. A wing as in claim 1 wherein said nacelle is a turbofan engine nacelle and said nacelle attachment position is aft of a highlight of said nacelle.

4. A wing as in claim 1 wherein said nacelle is an open rotor engine nacelle and said nacelle attachment position is aft of a spinner base of said nacelle.

5. A wing as in claim 1 wherein said nacelle is a turbofan engine nacelle and said nacelle attachment position is approximately at an intake lip of said nacelle.

6. A wing as in claim 1 wherein said nacelle is an open rotor engine nacelle and said nacelle attachment position is approximately midway between a spinner base of said nacelle and said index position.

7. A wing as in claim 1 wherein said nacelle is a turbofan engine nacelle, said sweep of said inboard section leading edge is 0 degrees and said nacelle attachment position is aft a highlight of said nacelle.

8. A wing as in claim 1 wherein said nacelle is an open rotor engine nacelle, said sweep of said inboard section leading edge is 0 degrees and said nacelle attachment position is aft of a spinner base of said nacelle.

9. A wing as in claim 1 wherein said nacelle is a turbofan engine nacelle, said sweep of said inboard section leading edge is 0 degrees and said nacelle attachment position is approximately at an intake lip of said nacelle.

10. A wing as in claim 1 wherein said nacelle is an open rotor engine nacelle, said sweep of said inboard section leading edge is 0 degrees and said nacelle attachment position is approximately midway between a spinner base of said nacelle and said index position.

11. A wing, comprising:
    an inboard section adapted to be attached on one side thereof to a fuselage and adapted to be attached on an opposing side thereof to an inboard side of a turbofan engine nacelle in an over-the-wing mounting position, said inboard section having a leading edge and a trailing edge;
    an outboard section adapted to be attached on one side thereof to an outboard side of said nacelle, said outboard section having a leading edge and a trailing edge;

said outboard section leading edge having a sweep of at least 20 degrees;

said inboard section leading edge having a sweep of approximately 0 degrees; and said inboard section leading edge extending from said fuselage to an attachment position on said nacelle that is (i) forward of an index position on the inboard side of said nacelle, said index position defined as an imaginary intersection between said sweep of said outboard section and said inboard side of said nacelle, and (ii) aft of a highlight of said nacelle, and further wherein the attachment position on said fuselage is forward of said index position.

12. A wing as in claim 7 wherein said nacelle attachment position is approximately at an intake lip of said nacelle.

13. A wing, comprising:

an inboard section adapted to be attached on one side thereof to a fuselage and adapted to be attached on an opposing side thereof to an inboard side of an open rotor engine nacelle in an over-the-wing mounting position, said inboard section having a leading edge and a trailing edge;

an outboard section adapted to be attached on one side thereof to an outboard side of said nacelle, said outboard section having a leading edge and a trailing edge;

said outboard section leading edge having a sweep of at least 20 degrees;

said inboard section leading edge having a sweep of approximately 0 degrees; and said inboard section leading edge extending from said fuselage to an attachment position on said nacelle that is (i) forward of an index position on said inboard side of said nacelle, said index position defined as an imaginary intersection between said sweep of said outboard section and said inboard side of said nacelle, and (ii) aft of a spinner base of said nacelle, and further wherein the attachment position on said fuselage is forward of said index position.

14. A wing as in claim 13 wherein said nacelle attachment position is approximately midway between said spinner base and said index position.

15. A wing, comprising:

an inboard section adapted to be attached on one side thereof to a fuselage and adapted to be attached on an opposing side thereof to an inboard side of an engine nacelle in an over-the-wing mounting position, said inboard section having a leading edge and a trailing edge;

a substantially trapezoidal outboard section adapted to be attached on one side thereof to an outboard side of said nacelle wherein said nacelle is integrated into said inboard section and said outboard section in the over-the-wing mounting position, said outboard section having a leading edge and a trailing edge;

said outboard section leading edge having a sweep of at least 20 degrees;

said outboard section trailing edge joining to said inboard section trailing edge aft of said nacelle;

said inboard section leading edge having a sweep between −15 and +15 degrees; and said inboard section leading edge extending from said fuselage to an attachment position on said nacelle that is forward of an index position on the inboard side of said nacelle, said index position defined as an imaginary intersection between said sweep of said outboard section and said inboard side of said nacelle, further wherein the attachment position on said fuselage is forward of said index position.

16. A wing as in claim 15 wherein said sweep of said inboard section leading edge is 0 degrees.

17. A wing as in claim 15 wherein said nacelle is a turbofan engine nacelle and said nacelle attachment position is aft of a highlight of said nacelle.

18. A wing as in claim 15 wherein said nacelle is an open rotor engine nacelle and said nacelle attachment position is aft of a spinner base of said nacelle.

19. A wing as in claim 15 wherein said nacelle is a turbofan engine nacelle and said nacelle attachment position is approximately at an intake lip of said nacelle.

20. A wing as in claim 15 wherein said nacelle is an open rotor engine nacelle and said nacelle attachment position is approximately midway between a spinner base of said nacelle and said index position.

21. A wing as in claim 15 wherein said nacelle is a turbofan engine nacelle, said sweep of said inboard section leading edge is 0 degrees and said nacelle attachment position is aft of a highlight of said nacelle.

22. A wing as in claim 15 wherein said nacelle is an open rotor engine nacelle, said sweep of said inboard section leading edge is 0 degrees and said nacelle attachment position is aft of a spinner base of said nacelle.

23. A wing as in claim 15 wherein said nacelle is a turbofan engine nacelle, said sweep of said inboard section leading edge is 0 degrees and said nacelle attachment position is approximately at an intake lip of said nacelle.

24. A wing as in claim 15 wherein said nacelle is an open rotor engine nacelle, said sweep of said inboard section leading edge is 0 degrees and said nacelle attachment position is approximately at an intake lip of said nacelle.

* * * * *